(12) United States Patent
Disteldorf et al.

(10) Patent No.: US 10,294,150 B2
(45) Date of Patent: *May 21, 2019

(54) COATED ARTICLE WITH LOW-E COATING HAVING LOW VISIBLE TRANSMISSION

(71) Applicants: GUARDIAN EUROPE S.À.R.L., Bertrange (LU); Guardian Glass, LLC, Auburn Hills, MI (US)

(72) Inventors: Bernd Disteldorf, Mettlach (DE); Anton Dietrich, Fontnas (CH); Krishna Swamynaidu, Auburn Hills, MI (US)

(73) Assignees: Guardian Europe S.A.R.L., Bertrange (LU); Guardian Glass, LLC, Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/846,320

(22) Filed: Dec. 19, 2017

(65) Prior Publication Data

US 2018/0105460 A1    Apr. 19, 2018

Related U.S. Application Data

(63) Continuation of application No. 14/910,766, filed as application No. PCT/US2013/055357 on Aug. 16, 2013, now Pat. No. 9,873,634.

(51) Int. Cl.
    *B32B 15/04*    (2006.01)
    *B32B 17/06*    (2006.01)
    (Continued)

(52) U.S. Cl.
    CPC .......... *C03C 17/3681* (2013.01); *C03C 17/36* (2013.01); *C03C 17/366* (2013.01);
    (Continued)

(58) Field of Classification Search
    USPC ....... 428/426, 428, 432, 434, 688, 689, 697, 428/699, 701, 702
    See application file for complete search history.

(56) References Cited

U.S. PATENT DOCUMENTS

| | | | | |
|---|---|---|---|---|
| 5,557,462 A | * | 9/1996 | Hartig | C03C 17/36 359/580 |
| 6,632,491 B1 | * | 10/2003 | Thomsen | C03C 17/36 156/109 |

(Continued)

FOREIGN PATENT DOCUMENTS

| | | |
|---|---|---|
| EP | 0 722 913 | 7/1996 |
| EP | 2 284 135 | 2/2011 |

(Continued)

OTHER PUBLICATIONS

U.S. Appl. No. 14/910,766, filed Aug. 16, 2013; Disteldorf et al.

(Continued)

*Primary Examiner* — Lauren R Colgan
(74) *Attorney, Agent, or Firm* — Nixon & Vanderhye P.C.

(57) ABSTRACT

This invention relates to a coated article including a low-emissivity (low-E) coating. In certain example embodiments, the low-E coating is provided on a substrate (e.g., glass substrate) and includes at least first and second infrared (IR) reflecting layers (e.g., silver based layers) that are spaced apart by contact layers (e.g., NiCr based layers) and a dielectric layer of or including a material such as silicon nitride. In certain example embodiments, the coated article has a low visible transmission (e.g., no greater than 60%, more preferably no greater than about 55%, and most preferably no greater than about 50%).

10 Claims, 2 Drawing Sheets

(51) Int. Cl.
*C03C 17/36* (2006.01)
*C09D 5/32* (2006.01)

(52) U.S. Cl.
CPC ...... *C03C 17/3613* (2013.01); *C03C 17/3626* (2013.01); *C03C 17/3636* (2013.01); *C03C 17/3639* (2013.01); *C03C 17/3644* (2013.01); *C03C 17/3652* (2013.01); *C09D 5/32* (2013.01)

(56) References Cited

U.S. PATENT DOCUMENTS

| | | | |
|---|---|---|---|
| 7,005,190 B2 * | 2/2006 | Laird | C03C 17/36 428/432 |
| 7,138,182 B2 | 11/2006 | Krisko et al. | |
| 7,166,360 B2 * | 1/2007 | Coustet | C03C 17/36 428/428 |
| 7,419,725 B2 | 9/2008 | Neuman et al. | |
| 8,445,112 B2 | 5/2013 | Di Stefano | |
| 8,940,399 B2 | 1/2015 | Wuillaume et al. | |
| 9,873,634 B2 | 1/2018 | Disteldorf et al. | |
| 2003/0194570 A1 | 10/2003 | Lingle et al. | |
| 2004/0043226 A1 * | 3/2004 | Laird | B32B 17/10036 428/432 |
| 2004/0121163 A1 * | 6/2004 | Laird | C03C 17/36 428/428 |
| 2005/0196622 A1 * | 9/2005 | Laird | C03C 17/36 428/432 |
| 2006/0046018 A1 | 3/2006 | Lemmer et al. | |
| 2007/0036987 A1 | 2/2007 | Landa et al. | |
| 2009/0324967 A1 * | 12/2009 | Disteldorf | C03C 17/36 428/428 |
| 2010/0279144 A1 * | 11/2010 | Frank | C03C 17/36 428/623 |
| 2011/0097590 A1 | 4/2011 | Lemmer et al. | |
| 2011/0135955 A1 | 6/2011 | Maschwitz et al. | |
| 2011/0261442 A1 | 10/2011 | Knoll et al. | |
| 2011/0262726 A1 * | 10/2011 | Knoll | C03C 17/36 428/213 |
| 2012/0219821 A1 * | 8/2012 | Frank | C03C 17/36 428/630 |
| 2012/0225224 A1 * | 9/2012 | Blacker | C03C 17/36 428/34 |

FOREIGN PATENT DOCUMENTS

| | | |
|---|---|---|
| RU | 94035687 | 9/1996 |
| RU | 2011102564 | 7/2012 |
| WO | WO 02/48065 | 6/2002 |
| WO | WO 2005/091864 | 10/2005 |
| WO | WO 2006/063171 | 6/2006 |
| WO | WO 2011/133201 | 10/2011 |
| WO | WO 2012/050596 | 4/2012 |

OTHER PUBLICATIONS

US/PCT/2013/055357 filed Feb. 8, 2016.
International Search Report dated May 23, 2014 for PCT/US2013/055357 (8pgs).
Written Opinion dated May 23, 2014 for PCT/US2013/0553357 (7pgs).

* cited by examiner

COATED ARTICLE WITH LOW-E COATING HAVING LOW VISIBLE TRANSMISSION

This application is a continuation of application Ser. No. 14/910,766 filed Feb. 8, 2016, which is a 371 (national stage) of PCT/US2013/055357 filed Aug. 16, 2013, the entire disclosures of which are hereby incorporated herein by reference in this application in their entireties.

This invention relates to a coated article including a low-emissivity (low-E) coating. In certain example embodiments, the low-E coating is provided on a substrate (e.g., glass substrate) and includes at least first and second infrared (IR) reflecting layers (e.g., silver based layers) that are spaced apart by contact layers (e.g., NiCr based layers) and a dielectric layer of or including a material such as silicon nitride. In certain example embodiments, the coated article (monolithic form and/or in IG window unit form) has a low visible transmission (e.g., no greater than 60%, more preferably no greater than about 55%, and most preferably no greater than about 50%). In certain example embodiments, the coated article may be heat treated (e.g., thermally tempered and/or heat bent), and is designed to be substantially thermally stable upon heat treatment (HT) in that its $\Delta E^*$ value (glass side reflective) due to HT is no greater than 5.0, and more preferably no greater than 4.5. Coated articles according to certain example embodiments of this invention may be used in the context of insulating glass (IG) window units, vehicle windows, other types of windows, or in any other suitable application.

BACKGROUND OF THE INVENTION

Coated articles are known in the art for use in window applications such as insulating glass (IG) window units, vehicle windows, and/or the like. It is known that in certain instances, it is desirable to heat treat (e.g., thermally temper, heat bend and/or heat strengthen) such coated articles for purposes of tempering, bending, or the like. Heat treatment (HT) of coated articles typically requires use of temperature(s) of at least 580 degrees C., more preferably of at least about 600 degrees C. and still more preferably of at least 620 degrees C. Such high temperatures (e.g., for 5-10 minutes or more) often cause coatings to break down and/or deteriorate or change in an unpredictable manner. Thus, it is desirable for coatings to be able to withstand such heat treatments (e.g., thermal tempering), if desired, in a predictable manner that does not significantly damage the coating.

In certain situations, designers of coated articles strive for a combination of desirable visible transmission, desirable color, low emissivity (or emittance), and low sheet resistance ($R_s$). Low-emissivity (low-E) and low sheet resistance characteristics permit such coated articles to block significant amounts of IR radiation so as to reduce for example undesirable heating of vehicle or building interiors.

U.S. Pat. No. 7,521,096, incorporated herein by reference, discloses a low-E coating which uses zinc oxide (ZnO) contact layers below the silver-based IR reflecting layers, and above the bottom silver (Ag) based IR reflecting layer uses a $NiCrO_x$ contact layer followed by a center tin oxide ($SnO_2$) dielectric layer. While the ZnO contact layers below the silver IR reflecting layers provide good structural properties for the growth of silver, the ZnO has been found to degrade the chemical, environmental and mechanical durability of the coating in certain instances. Moreover, the thick $SnO_2$ dielectric layer has been found to show micro crystallization and stress upon HT which causes rough interfaces between the $SnO_2$, the ZnO and the Ag, which can lead to degradation of durability and affect transmitted color.

U.S. Pat. No. 5,557,462 discloses a low-E coating with a layer stack of SiN/NiCr/Ag/NiCr/SiN/NiCr/Ag/NiCr/SiN. However, the coated article of the '462 patent is designed for a high visible transmission of at least 63%. The '462 patent at column 3, lines 12-15, teaches that visible transmission below 70% (monolithic coated article) and below 63% (IG window unit) are undesirable. Thus, the '462 patent teaches directly away from coated articles with visible transmission lower than 63%. Moreover, as largely explained in U.S. Pat. No. 8,173,263, coated articles of the '462 patent are not heat treatable because upon heat treatment sheet resistance ($R_s$) goes way up such as from about 3-5 to well over 10, haze tends to set in, and the glass side reflective $\Delta E^*$ value is undesirable because it is over 5.0.

Accordingly, it would be desirable to provided a coated article that is characterized by one or more of: (i) low visible transmission, (ii) good durability, and (iii) thermal stability upon HT so as to realize a glass side reflective $\Delta E^*$ value no greater than about 5.0, more preferably no greater than about 4.5.

The term $\Delta E^*$ (and $\Delta E$) is well understood in the art and is reported, along with various techniques for determining it, in ASTM 2244-93 as well as being reported in Hunter et. al., *The Measurement of Appearance*, $2^{nd}$ Ed. Cptr. 9, page 162 et seq. [John Wiley & Sons, 1987]. As used in the art, $\Delta E^*$ (and $\Delta E$) is a way of adequately expressing the change (or lack thereof) in reflectance and/or transmittance (and thus color appearance, as well) in an article after or due to heat treatment. $\Delta E$ may be calculated by the "ab" technique, or by the Hunter technique (designated by employing a subscript "H"). $\Delta E$ corresponds to the Hunter Lab L, a, b scale (or $L_h$, $a_h$, $b_h$). Similarly, $\Delta E^*$ corresponds to the CIE LAB Scale $L^*$, $a^*$, $b^*$. Both are deemed useful, and equivalent for the purposes of this invention. For example, as reported in Hunter et. al. referenced above, the rectangular coordinate/scale technique (CIE LAB 1976) known as the $L^*$, $a^*$, $b^*$ scale may be used, wherein: $L^*$ is (CIE 1976) lightness units; $a^*$ is (CIE 1976) red-green units; $b^*$ is (CIE 1976) yellow-blue units; and the distance $\Delta E^*$ between $L^*_o$ $a^*_o$ $b^*_o$ and $L^*_1$ $a^*_1$ $b^*_1$ is: $\Delta E^* = [(\Delta L^*)^2 + (\Delta a^*)^2 + (\Delta b^*)^2]^{1/2}$, where: $\Delta L^* = L^*_1 - L^*_o$; $\Delta a^* = a^*_1 - a^*_o$; $\Delta b^* = b^*_1 - b^*_o$; where the subscript "o" represents the coating (coated article) before heat treatment and the subscript "1" represents the coating (coated article) after heat treatment; and the numbers employed (e.g., $a^*$, $b^*$, $L^*$) are those calculated by the aforesaid (CIE LAB 1976) $L^*$, $a^*$, $b^*$ coordinate technique. When, for example, glass side reflective $\Delta E^*$ values are measured, then glass side reflective $a^*$, $b^*$ and $L^*$ values are used. In a similar manner, $\Delta E$ may be calculated using the above equation for $\Delta E^*$, i.e., $\Delta E^* = [(\Delta L^*)^2 + (\Delta a^*)^2 + (\Delta b^*)^2]^{1/2}$, by replacing $a^*$, $b^*$, $L^*$ with Hunter Lab values $a_h$, $b_h$, $L_h$. Also within the scope of this invention and the quantification of $\Delta E^*$ are the equivalent numbers if converted to those calculated by any other technique employing the same concept of $\Delta E^*$ as defined above.

BRIEF SUMMARY OF EXAMPLE EMBODIMENTS OF THE INVENTION

This invention relates to a coated article including a low-emissivity (low-E) coating. In certain example embodiments, the low-E coating is provided on a substrate (e.g., glass substrate) and includes at least first and second infrared (IR) reflecting layers (e.g., silver based layers) that are spaced apart by contact layers (e.g., NiCr based layers) and a dielectric layer of or including a material such as silicon nitride. In certain example embodiments, the coated article has a low visible transmission (e.g., no greater than 60%, more preferably no greater than about 55%, more preferably no greater than about 50%. In certain example embodiments, the coated article may be heat treated (e.g., thermally tempered and/or heat bent), and is designed to be substantially thermally stable upon heat treatment (HT) in that its ΔE* value (glass side reflective) due to HT is no greater than 5.0, more preferably no greater than 4.5. Such a low ΔE* value indicates that the coated article has approximately the same transmission and color characteristics as viewed by the naked eye both before and after heat treatment (e.g., thermal tempering). Coated articles according to certain example embodiments of this invention may be used in the context of insulating glass (IG) window units, vehicle windows, other types of windows, or in any other suitable application.

Moreover, in certain example embodiments in this invention, the coating includes a layer (e.g., overcoat) of or including zirconium oxide and/or zirconium oxynitride. In certain example embodiments, this layer of or including zirconium oxide and/or zirconium oxynitride is substantially thinner than each of the IR reflecting layers comprising silver in the coating.

It is desired to provide a coated article that is characterized by one, two, or all three of: (i) low visible transmission, (ii) good durability, and (iii) thermal stability upon HT so as to realize a glass side reflective ΔE* value no greater than 5.0, more preferably no greater than 4.5.

In certain example embodiments of this invention, there is provided a coated article including a coating supported by a glass substrate, the coating comprising: first and second infrared (IR) reflecting layers comprising silver, the first IR reflecting layer being located closer to the glass substrate than is the second IR reflecting layer; a first contact layer comprising NiCr located over and directly contacting the first IR reflecting layer comprising silver; a dielectric layer comprising silicon nitride located over and directly contacting the first contact layer comprising NiCr; a second contact layer comprising NiCr located over and directly contacting the layer comprising silicon nitride; the second IR reflecting layer comprising silver located over and directly contacting the second contact layer comprising NiCr; a third contact layer comprising NiCr located over and directly contacting the second IR reflecting layer; another dielectric layer comprising silicon nitride located over and directly contacting the third contact layer comprising NiCr; a layer comprising zirconium oxide located over and directly contacting the another dielectric layer comprising silicon nitride; wherein the second IR reflecting layer comprising silver is thicker than is the first IR reflecting layer comprising silver; wherein each of the first and second IR reflecting layers comprising silver is at least twice as thick as the layer comprising zirconium oxide; and wherein the coated article has a visible transmission, measured monolithically, of no greater than 60%.

DETAILED DESCRIPTION OF EXAMPLE EMBODIMENTS OF THE INVENTION

Coated articles herein may be used in applications such as IG window units, laminated window units (e.g., for use in vehicle or building applications), vehicle windows, monolithic architectural windows, residential windows, and/or any other suitable application that includes single or multiple glass substrates.

Figure 1:
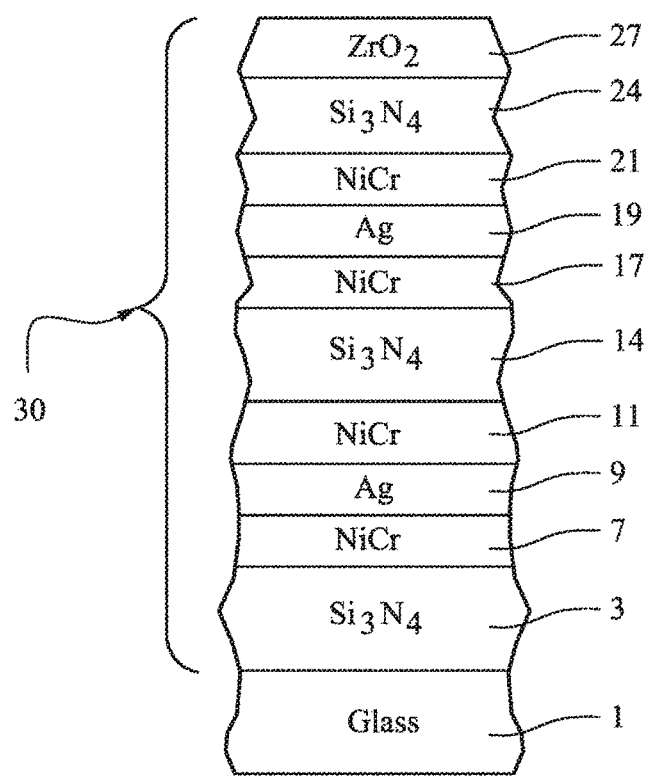
FIG. 1 is a cross sectional view of a coated article according to an example embodiment of this invention.

In certain example embodiments of this invention, the coating includes a double-silver stack. Referring to FIG. 1 for example, in certain example embodiments of this invention, there is provided a coated article including a coating supported by a glass substrate, the coating comprising: first 9 and second 19 infrared (IR) reflecting layers comprising or consisting essentially of silver, the first IR reflecting layer 9 being located closer to the glass substrate 1 than is the second IR reflecting layer 19; a first contact layer comprising NiCr 7 located under and directly contacting the first IR reflecting layer comprising silver 9, a second contact layer 11 located over and directly contacting the first IR reflecting layer comprising silver 9; a dielectric layer comprising silicon nitride 14 located over and directly contacting the first contact layer comprising NiCr 11; a third contact layer comprising NiCr 17 located over and directly contacting the layer comprising silicon nitride 14; the second IR reflecting layer comprising silver 19 located over and directly contacting the second contact layer comprising NiCr 17; a fourth contact layer comprising NiCr 21 located over and directly contacting the second IR reflecting layer 19, and wherein the second IR reflecting layer comprising silver 19 is at least as thick as the first IR reflecting layer comprising silver 9. In certain preferred embodiments, it has been found that surprisingly beneficial results can be achieved when the second IR reflecting layer comprising silver 19 is thicker than the first IR reflecting layer comprising silver 9, more preferably when second IR reflecting layer 19 is at least 10 angstroms (Å) thicker (more preferably at least 20 angstroms thicker) than the first IR reflecting layer comprising silver 9. The coating includes three dielectric layers 3, 14 and 24 of or including silicon nitride, as shown in FIG. 1. Moreover, the coating includes a layer (e.g., overcoat) 27 of or including zirconium oxide and/or zirconium oxynitride. In certain example embodiments, this layer of or including zirconium oxide and/or zirconium oxynitride 27 is thinner than one or both of the IR reflecting layers 9, 19 comprising silver in the coating. In certain example embodiments of this invention, each of the IR reflecting layers comprising silver 9 and 19 is at least twice as thick, and more preferably at least three times as thick, as the layer 27 or including zirconium oxide and/or zirconium oxynitride. In certain example embodiments of this invention, the coating includes only two IR reflecting layers 9, 19 of or including silver or the like.

Figure 2:
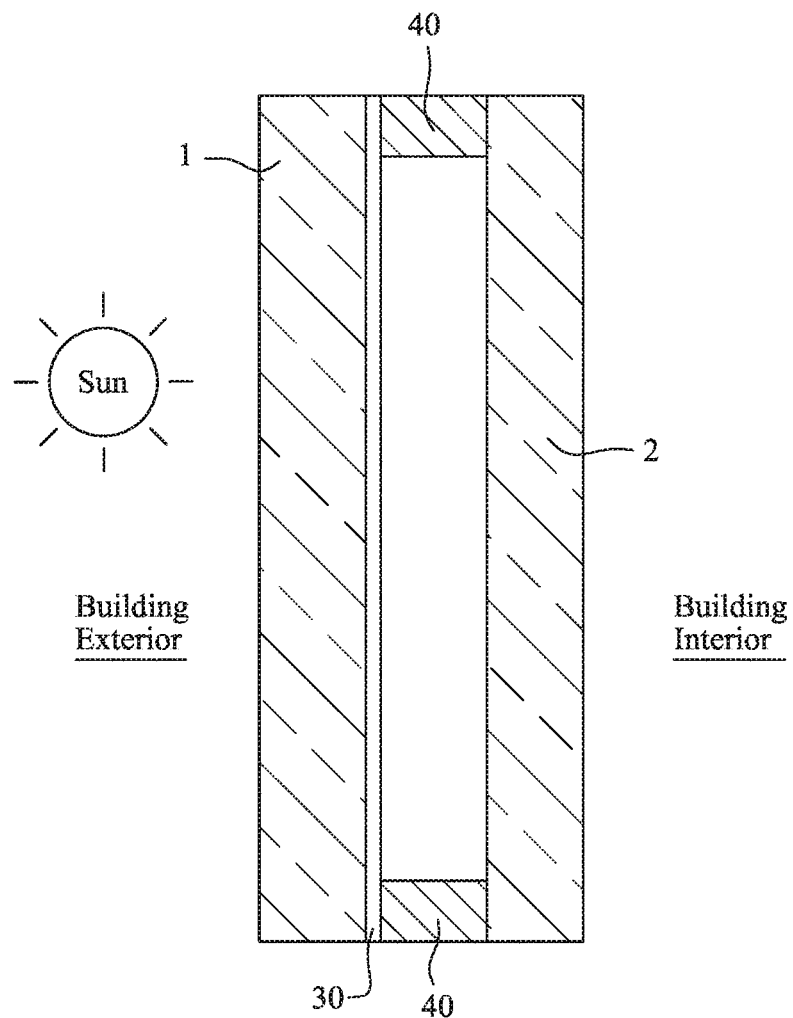
FIG. 2 is a cross sectional view showing the coated article of FIG. 1 provided in an IG window unit according to an example embodiment of this invention.

In order to increase durability, along with optics and thermal properties, and avoid significant structural changes before and after HT, coated articles according to certain example embodiments of this invention have a center dielectric layer 14 of or including silicon nitride and lower contact layers 7, 17 are based on NiCr (as opposed to ZnO). It has also been found that using metallic or substantially metallic NiCr (possibly partly nitrided) for layer(s) 7, 11, 17 and/or 21 improves chemical, mechanical and environmental durability (compared to using ZnO lower contact layers below silver and/or highly oxided NiCr upper contact layers above silver). It has also been found that sputter-depositing silicon nitride inclusive layer 14 in an amorphous state, so that it is amorphous in both as-coated and HT states, helps with overall stability of the coating. For example, 5% HCl at 65 degrees C. for one hour will remove the coating of U.S. Pat. No. 7,521,096, whereas the coating shown in FIG. 1 and the examples herein will survive this HCl test. And in high temperature and high humidity environment, there is less damage to the coating of FIG. 1 and the examples herein after ten days of exposure, than to the coating of the '096 patent after two days of exposure. And regarding high corrosive chemicals such as those used for "brick wash", corrosion resistance is such that edge deletion need not be performed in certain example IG and laminated embodiments. Similarly, for mechanical abrasion tests, thermal cycling and salt fog tests, the coatings of the examples herein were found to be better than that of the '096 patent. Moreover, it has been found that making the top Ag based IR reflecting layer 19 thicker than the bottom Ag based IR reflecting layer 9 improves certain optical characteristics of the coating. The coating can be used as-coated, or heat treated, due to the relatively low ΔE* values discussed herein. For example, when the coating 30 is located surface #2 of an IG window unit (as shown in FIG. 2), low glass side reflective ΔE* values due to heat treatment indicate that the coated article has approximately the same transmission and color characteristics as viewed by the naked eye both before and after heat treatment (e.g., thermal tempering), and thus can be used either as-coated or as heat treated without significantly affecting optical characteristics thereof.

In certain example embodiments of this invention such as FIG. 1, heat treated or non-heat-treated coated articles having multiple IR reflecting layers (e.g., two spaced apart silver based layers) are capable of realizing a sheet resistance ($R_s$) of less than or equal to 5.0 (more preferably less than or equal to 4.0, even more preferably less than or equal to 3.0). The terms "heat treatment" and "heat treating" as used herein mean heating the article to a temperature sufficient to achieve thermal tempering, heat bending, and/or heat strengthening of the glass inclusive article. This definition includes, for example, heating a coated article in an oven or furnace at a temperature of least about 580 degrees C., more preferably at least about 600 degrees C., for a sufficient period to allow tempering, bending, and/or heat strengthening. In certain instances, the HT may be for at least about 4 or 5 minutes. The coated article may or may not be heat treated in different embodiments of this invention.

FIG. 1 is a side cross sectional view of a coated article according to an example non-limiting embodiment of this invention. The coated article includes substrate 1 (e.g., clear, green, bronze, or blue-green glass substrate from about 1.0 to 10.0 mm thick, more preferably from about 1.0 mm to 3.5 mm thick), and low-E coating (or layer system) 30 provided on the substrate 1 either directly or indirectly. The coating (or layer system) 30 includes, for example: bottom dielectric silicon nitride layer 3 which may be $Si_3N_4$, or of the Si-rich type silicon nitride for haze reduction, or of any other suitable stoichiometry silicon nitride in different embodiments of this invention, lower contact layer 7 (which contacts bottom IR reflecting layer 9), first conductive and preferably metallic or substantially metallic infrared (IR) reflecting layer 9, upper contact layer 11 (which contacts layer 9), dielectric silicon nitride based and/or inclusive layer 14, lower contact layer 17 (which contacts IR reflecting layer 19), second conductive and preferably metallic or substantially metallic IR reflecting layer 19, upper contact layer 21 (which contacts layer 19), dielectric silicon nitride layer 24 which may be $Si_3N_4$, of the Si-rich type for haze reduction, or of any other suitable stoichiometry silicon nitride in different embodiments of this invention, and overcoat layer 27 of or including a material such as zirconium oxide (e.g., $ZrO_2$) and/or zirconium oxynitride. The "contact" layers 7, 11, 17 and 21 each contact an IR reflecting layer (e.g., layer based on Ag). The aforesaid layers 3-27 make up low-E (i.e., low emissivity) coating 30 that is provided on glass or plastic substrate 1. Layers 3-27 may be sputter-deposited on the substrate 1 in certain example embodiments of this invention, with each layer being sputter-deposited in vacuum using one or more targets as needed (the sputtering targets may be ceramic or metallic). Metallic or substantially metallic layers (e.g., layers 7, 9, 11, 17, 19 and 21) may be sputtered in an atmosphere containing argon gas, whereas nitrided layers (e.g., layers 3, 7, 11, 14, 17, 21 and 24) may be sputtered in an atmosphere containing a mixture of nitrogen and argon gas. The contact layers 7, 11, 17 and 21 may or may not be nitride in different example embodiments of this invention.

In monolithic instances, the coated article includes only one glass substrate 1 as illustrated in FIG. 1. However, monolithic coated articles herein may be used in devices such as laminated vehicle windshields, IG window units, and the like. As for IG window units, an IG window unit may include two spaced apart glass substrates. An example IG window unit is illustrated and described, for example, in U.S. Patent Document No. 2004/0005467, the disclosure of which is hereby incorporated herein by reference. FIG. 2 shows an example IG window unit including the coated glass substrate 1 shown in FIG. 1 coupled to another glass substrate 2 via spacer(s), sealant(s) 40 or the like, with a gap 50 being defined therebetween. This gap 50 between the substrates in IG window unit embodiments may in certain instances be filled with a gas such as argon (Ar). An example IG unit may comprise a pair of spaced apart clear glass substrates each about 3-4 mm thick, one of which is coated with a coating 30 herein in certain example instances, where the gap 50 between the substrates may be from about 5 to 30 mm, more preferably from about 10 to 20 mm, and most preferably about 16 mm. In certain example instances, the low-E coating 30 may be provided on the interior surface of either substrate facing the gap (the coating is shown on the interior major surface of substrate 1 in FIG. 2 facing the gap 50, but instead could be on the interior major surface of substrate 2 facing the gap 50). Either substrate 1 or substrate 2 may be the outermost substrate of the IG window unit at the building exterior (e.g., in FIG. 2 the substrate 1 is the substrate closest to the building exterior, and the coating 30 is provided on surface #2 of the IG window unit).

In certain example embodiments of this invention, one, two, three, or all four of contact layers 7, 11, 17, 21 may be of or include NiCr (any suitable ratio of Ni:Cr), and may or may not be nitrided ($NiCrN_x$). In certain example embodiments, one, two, three or all four of these NiCr inclusive layers 7, 11, 17, 21 is substantially or entirely non-oxidized. In certain example embodiments, layers 7, 11, 17 and 21 may all be of metallic NiCr or substantially metallic NiCr (although trace amounts of other elements may be present). In certain example embodiments, one, two, three or all four of NiCr based layers 7, 11, 17, 21 may comprise from 0-10% oxygen, more preferably from 0-5% oxygen, and most preferably from 0-2% oxygen (atomic %). In certain example embodiments, one, two, three or all four of these layers 7, 11, 17, 21 may contain from 0-20% nitrogen, more preferably from 1-15% nitrogen, and most preferably from about 1-12% nitrogen (atomic %). NiCr based layers 7, 11, 17 and/or 21 may or may not be doped with other material(s) such as stainless steel, Mo, or the like. It has been found that the use of NiCr based contact layer(s) 7 and/or 17 under the silver-based IR reflecting layer(s) 9, 19 improves durability of the coated article (compared to if layers 7 and 17 were instead of ZnO).

Dielectric layers 3, 14, and 24 may be of or include silicon nitride in certain embodiments of this invention. Silicon nitride layers 3, 14 and 24 may, among other things, improve heat-treatability of the coated articles and protect the other layers during optional HT, e.g., such as thermal tempering or the like. One or more of the silicon nitride of layers 3, 14, 24 may be of the stoichiometric type (i.e., $Si_3N_4$), or alternatively of the Si-rich type of silicon nitride in different embodiments of this invention. The presence of free Si in a Si-rich silicon nitride inclusive layer 3 and/or 14 may, for example, allow certain atoms such as sodium (Na) which migrate outwardly from the glass 1 during HT to be more efficiently stopped by the Si-rich silicon nitride inclusive layer(s) before they can reach silver and damage the same. Thus, it is believed that the Si-rich $Si_xN_y$ can reduce the amount of damage done to the silver layer(s) during HT in certain example embodiments of this invention thereby allowing sheet resistance ($R_s$) to decrease or remain about the same in a satisfactory manner. Moreover, it is believed that the Si-rich $Si_xN_y$ in layers 3, 14 and/or 24 can reduce the amount of damage (e.g., oxidation) done to the silver and/or NiCr during HT in certain example optional embodiments of this invention. In certain example embodiments, when Si-rich silicon nitride is used, the Si-rich silicon nitride layer (3, 14 and/or 24) as deposited may be characterized by $Si_xN_y$ layer(s), where x/y may be from 0.76 to 1.5, more preferably from 0.8 to 1.4, still more preferably from 0.82 to 1.2. Any and/or all of the silicon nitride layers discussed herein may be doped with other materials such as stainless steel or aluminum in certain example embodiments of this invention. For example, any and/or all silicon nitride layers 3, 14, 24 discussed herein may optionally include from about 0-15% aluminum, more preferably from about 1 to 10% aluminum, in certain example embodiments of this invention. The silicon nitride of layers 3, 14, 24 may be deposited by sputtering a target of Si or SiAl, in an atmosphere having argon and nitrogen gas, in certain embodiments of this invention. Small amounts of oxygen may also be provided in certain instances in the silicon nitride layers.

Infrared (IR) reflecting layers 9 and 19 are preferably substantially or entirely metallic and/or conductive, and may comprise or consist essentially of silver (Ag), gold, or any other suitable IR reflecting material. IR reflecting layers 9 and 19 help allow the coating to have low-E and/or good solar control characteristics.

Other layer(s) below or above the illustrated coating may also be provided. Thus, while the layer system or coating is "on" or "supported by" substrate 1 (directly or indirectly), other layer(s) may be provided therebetween. Thus, for example, the coating of FIG. 1 may be considered "on" and "supported by" the substrate 1 even if other layer(s) are provided between layer 3 and substrate 1. Moreover, certain layers of the illustrated coating may be removed in certain embodiments, while others may be added between the various layers or the various layer(s) may be split with other layer(s) added between the split sections in other embodiments of this invention without departing from the overall spirit of certain embodiments of this invention.

While various thicknesses and materials may be used in layers in different embodiments of this invention, example thicknesses and materials for the respective layers on the glass substrate 1 in the FIG. 1 embodiment are as follows, from the glass substrate outwardly (physical thicknesses recited):

| Example Materials/Thicknesses; FIG. 1 Embodiment | | | |
|---|---|---|---|
| Layer<br>Glass (1-10 mm thick) | Preferred Range<br>(Å) | More Preferred<br>(Å) | Example<br>(Å) |
| $Si_xN_y$ (layer 3) | 100-500 Å | 250-450 Å | 320 Å |
| NiCr or NiCrN (layer 7) | 10-30 Å | 11-20 Å | 12 Å |
| Ag (layer 9) | 100-170 Å | 110-145 Å | 127 Å |
| NiCr or NiCrN (layer 11) | 10-30 Å | 11-20 Å | 10 Å |
| $Si_xN_y$ (layer 14) | 300-1400 Å | 700-1100 Å | 865 Å |
| NiCr or NiCrN (layer 17) | 10-30 Å | 11-20 Å | 11 Å |
| Ag (layer 19) | 140-225 Å | 150-215 Å | 164 Å |
| NiCr or NiCrN (layer 21) | 8-30 Å | 10-20 Å | 10 Å |
| $Si_3N_4$ (layer 24) | 120-360 Å | 250-340 Å | 304 Å |
| $ZrO_2$ (layer 27) | 25-80 Å | 25-50 Å | 35 Å |

The second IR reflecting layer comprising silver 19 is at least as thick as the first IR reflecting layer comprising silver 9. In certain preferred embodiments, it has been found that surprisingly beneficial results can be achieved when the second IR reflecting layer comprising silver 19 is thicker than the first IR reflecting layer comprising silver 9, more preferably when second IR reflecting layer 19 is at least 10 angstroms (Å) thicker (more preferably at least 20 angstroms thicker) than the first IR reflecting layer comprising silver 9.

In certain example embodiments, the layer of or including zirconium oxide and/or zirconium oxynitride 27 is thinner than each of the IR reflecting layers 9, 19 comprising silver in the coating 30. In certain example embodiments of this invention, each of the IR reflecting layers comprising silver 9 and 19 is at least twice as thick, and more preferably at least three times as thick, as the layer 27 or including zirconium oxide and/or zirconium oxynitride.

In certain example embodiments, the center silicon nitride based layer 14 is thicker than each of the other silicon nitride based layers 3 and 24, preferably by at least 100 angstroms, more preferably by at least 300 angstroms, and most preferably by 400 angstroms. Moreover, in certain example embodiments, each of the silicon nitride based layers 3, 14 and 24 is at least two times as thick as the zirconim oxide inclusive layer 27, more preferably at least three times as thick, and most preferably at least four or five times as thick.

The coating 30 offers good durability and allows for lower inside and outside reflection compared to a single-silver based low-E coating. However, delta-E* values are typically in the 4-5 range. The coating, and coated articles including the coating, may be designed to appear light blue in transmission and reflection, but may become slightly more neutral after optional HT.

In certain example embodiments of this invention, coated articles herein may have the following optical and solar characteristics set forth in Table 2 when measured monolithically (before and/or after optional HT). The sheet resistances ($R_s$) herein take into account all IR reflecting layers (e.g., silver layers 9, 19). Note that "before heat treatment" means as annealed, but before high temperature heat treatment such as thermal tempering as described herein.

| Optical/Solar Characteristics (Monolithic - Before Heat Treatment) | | | |
|---|---|---|---|
| Characteristic | General | More Preferred | Most Preferred |
| $R_s$ (ohms/sq.): | <=5.0 | <=4.0 | <=3.0 |
| $E_n$: | <=0.08 | <=0.05 | <=0.04 |
| $T_{vis}$ (Ill. C 2°): | 30-63% | 45-60% | 50-59% |

| Optical/Solar Characteristics (Monolithic - Post Heat Treatment) | | | |
|---|---|---|---|
| Characteristic | General | More Preferred | Most Preferred |
| $R_s$ (ohms/sq.): | <=5.0 | <=4.0 | <=3.0 |
| $E_n$: | <=0.08 | <=0.05 | <=0.04 |
| $T_{vis}$ (Ill. C 2°): | 30-63% | 48-61% | 52-60% |

It can be seen from the above that the heat treatment (e.g., thermal tempering) slightly increases the visible transmission of the coated article.

In certain example laminated embodiments of this invention, coated articles herein which have been optionally heat treated to an extent sufficient for tempering, and which have been coupled to another glass substrate to form an IG unit, may have the above recited Optical/Solar characteristics in a structure as shown in FIG. 2 (e.g., where the two glass sheets are each 6 mm thick of clear glass with a 16 mm gap therebetween filled with 90/10 argon/air). Such IG window units may have a visible transmission of from about 20-55% in certain example embodiments of this invention.

The following examples are provided for purposes of example only, and are not intended to be limiting unless specifically claimed.

EXAMPLES 1-3

The following Examples 1-3 were made via sputtering coatings on 6 mm thick clear/transparent glass substrates so as to have approximately the layer stacks set forth in FIG. 1 with the respective layer thicknesses shown in the "example" column in the chart above regarding layer thicknesses.

Set forth below are the optical characteristics of Examples 1-3 measured for a monolithic coated article as shown in FIG. 1. All values measured in the table immediately below are pre-HT. Note that "f" refers to film reflection, i.e., reflection from the film side of the coated article, whereas "g" refers to glass side reflection.

| Monolithic (Pre-HT) | | | |
|---|---|---|---|
| Characteristic | Ex. 1 | Ex. 2 | Ex. 3 |
| $T_{vis}$ (or TY)(Ill. C 2°): | 52.3% | 54% | 54.5% |
| $a^*_t$ (Ill. C 2°): | -2.8 | -4.0 | -3.6 |
| $b^*_t$ (Ill. C 2°): | -5.2 | -4.6 | -6.1 |
| $R_fY$ (Ill. C, 2 deg.): | 10.3% | 8.4% | 7.1% |
| $a^*_f$ (Ill. C, 2°): | -10.5 | -5.4 | -5.1 |
| $b^*_f$ (Ill. C, 2°): | 8.5 | 1.8 | 1.9 |
| $R_gY$ (Ill. C, 2 deg.): | 9.8 | 8.7% | 8.0% |
| $a^*_g$ (Ill. C, 2°): | -4.3 | -1.9 | -1.3 |
| $b^*_g$ (Ill. C, 2°): | -5.7 | -9.3 | -9.4 |

It can be seen from the above the examples above that the coated articles measured monolithically had desirable low visible transmission, and had fairly desirable glass side reflective color. In particular, monolithic $a^*_g$ (glass side reflective a* color) was in a desirable range of from about -1 to -5, and $b^*_g$ (glass side reflective b* color) was in a desirable range of from about -5 to -10. Moreover, glass side reflection (RgY) was good in that it was below 10%, more preferably no greater than 9%. These are desirable characteristics, especially when the coated article is to be put in an IG window unit as shown in FIG. 2.

Set forth below are the optical characteristics of Examples 1-3 measured for a monolithic coated article after thermal tempering.

| Monolithic (Post-HT) | | | |
|---|---|---|---|
| Characteristic | Ex. 1 | Ex. 2 | Ex. 3 |
| $T_{vis}$ (or TY)(Ill. C 2°): | 59.8% | 55.6% | 54.2% |
| $a^*_t$ (Ill. C 2°): | -3.9 | -5.3 | -4.8 |
| $b^*_t$ (Ill. C 2°): | -5.0 | -6.2 | -6.6 |
| $R_fY$ (Ill. C, 2 deg.): | 10.4% | 6.1% | 6.7% |
| $a^*_f$ (Ill. C, 2°): | -14.8 | -5.3 | -6.4 |
| $b^*_f$ (Ill. C, 2°): | 8.2 | -0.3 | -0.6 |
| $R_gY$ (Ill. C, 2 deg.): | 9.7 | 9.0% | 9.1% |
| $a^*_g$ (Ill. C, 2°): | -9.6 | -0.9 | -0.9 |
| $b^*_g$ (Ill. C, 2°): | -3.9 | -10.9 | -10.2 |

It can be seen from the above the examples above that the coated articles measured monolithically had desirable low visible transmission, and had fairly desirable glass side reflective color. In particular, monolithic $a^*_g$ (glass side reflective a* color) was in a desirable range in Examples 2-3 of from about 0 to -2, and $b^*_g$ (glass side reflective b* color) was in a desirable range in Examples 2-3 of from about -8 to -12. Moreover, glass side reflection (RgY) was good in that it was below 10%. These are desirable characteristics, especially when the coated article is to be put in an IG window unit as shown in FIG. 2.

Set forth below are the optical characteristics of IG window units including the coated articles of Examples 1-3, namely when the coated articles are located in IG window units as shown in FIG. 2 (on surface #2 of the IG unit, so that glass side reflective values are indicative of from the outside). These values are for a non-HT coated article used in the IG unit (i.e., not thermally tempered).

| IG Unit (non-HT) | | | |
|---|---|---|---|
| Characteristic | Ex. 1 | Ex. 2 | Ex. 3 |
| $T_{vis}$ (or TY)(Ill. C 2°): | 47.1% | 48.4% | 48.4% |
| $a^*_t$ (Ill. C 2°): | -4.1 | -5.1 | -4.6 |
| $b^*_t$ (Ill. C 2°): | -4.6 | -4.3 | -5.4 |
| $R_fY$ (Ill. C, 2 deg.): | 16.3% | 14.8% | 13.5% |
| $a^*_f$ (Ill. C, 2°): | -7.2 | -4.1 | -4.3 |
| $b^*_f$ (Ill. C, 2°): | 4.3 | 0.7 | 1.5 |
| $R_gY$ (Ill. C, 2 deg.): | 12.0% | 11.0% | 10.0% |
| $a^*_g$ (Ill. C, 2°): | -4.4 | -2.7 | -2.4 |
| $b^*_g$ (Ill. C, 2°): | -6.3 | -9.3 | -9.2 |

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A coated article including a coating supported by a glass substrate, the coating comprising:
   a first dielectric layer comprising silicon nitride located on and directly contacting the glass substrate;
   first and second infrared (IR) reflecting layers comprising silver located over the dielectric layer comprising silicon nitride, the first IR reflecting layer being located closer to the glass substrate than is the second IR reflecting layer, and wherein no oxide based layer is located between the glass substrate and the first IR reflecting layer;
   a first contact layer comprising Ni and Cr located over and directly contacting the first IR reflecting layer comprising silver;

a second dielectric layer comprising silicon nitride located over and directly contacting the first contact layer comprising Ni and Cr;

a second contact layer comprising Ni and Cr located over and directly contacting the second dielectric layer comprising silicon nitride;

the second IR reflecting layer comprising silver located over and directly contacting the second contact layer comprising Ni and Cr;

a third contact layer comprising Ni and Cr located over and directly contacting the second IR reflecting layer;

a third dielectric layer comprising silicon nitride located over and directly contacting the third contact layer comprising Ni and Cr;

a layer comprising zirconium oxide located over and directly contacting the third dielectric layer comprising silicon nitride;

wherein each of the first and second IR reflecting layers comprising silver is at least twice as thick as the layer comprising zirconium oxide; and wherein the coated article has a visible transmission, measured monolithically, of no greater than 60%.

2. The coated article of claim 1, wherein each of the first and second IR reflecting layers comprising silver is at least three times as thick as the layer comprising zirconium oxide.

3. The coated article of claim 1, wherein the layer comprising zirconium oxide further comprises nitrogen.

4. The coated article of claim 1, wherein the second dielectric layer comprising silicon nitride is amorphous.

5. The coated article of claim 1, wherein the first contact layer comprising Ni and Cr is substantially metallic or metallic and contains no more than about 5% (atomic %) oxygen.

6. The coated article of claim 5, wherein the second contact layer comprising Ni and Cr is substantially metallic or metallic and contains no more than about 5% (atomic %) oxygen.

7. The coated article of claim 1, wherein said first, second and/or third contact layer further contains nitrogen.

8. The coated article of claim 1, wherein said coated article has a visible transmission of from about 20-55% measured monolithically.

9. The coated article of claim 1, wherein the coating further comprises another contact layer comprising Ni and Cr located below and directly contacting the first IR reflecting layer comprising silver, and wherein the another contact layer comprising Ni and Cr is located between and directly contacting the first IR reflecting layer and the first dielectric layer comprising silicon nitride that directly contacts the glass substrate.

10. A coated article including a coating supported by a glass substrate, the coating comprising:

a first dielectric layer comprising silicon nitride located on and directly contacting the glass substrate;

a first contact layer comprising NiCr located below and directly contacting a first infrared (IR) reflecting layer comprising silver, and wherein the first contact layer comprising NiCr is located between and directly contacting the first IR reflecting layer and the first dielectric layer comprising silicon nitride that directly contacts the glass substrate;

a second IR reflecting layer comprising silver located over the first dielectric layer comprising silicon nitride and over the first IR reflecting layer, the first IR reflecting layer being located closer to the glass substrate than is the second IR reflecting layer;

a second contact layer located over and directly contacting the first IR reflecting layer comprising silver;

a second dielectric layer comprising silicon nitride located over and directly contacting the second contact layer;

a third contact layer located over and directly contacting the second dielectric layer comprising silicon nitride;

the second IR reflecting layer comprising silver located over and directly contacting the third contact layer;

a fourth contact layer located over and directly contacting the second IR reflecting layer;

a third dielectric layer comprising silicon nitride located over and directly contacting the fourth contact layer;

a layer comprising zirconium oxide located over and directly contacting the third dielectric layer comprising silicon nitride;

wherein each of the first and second IR reflecting layers comprising silver is at least twice as thick as the layer comprising zirconium oxide; and wherein the coated article has a visible transmission, measured monolithically, of no greater than 60%.

* * * * *